US007917644B2

(12) United States Patent
Vedantham et al.

(10) Patent No.: US 7,917,644 B2
(45) Date of Patent: Mar. 29, 2011

(54) EXTENSIONS TO RICH MEDIA CONTAINER FORMAT FOR USE BY MOBILE BROADCAST/MULTICAST STREAMING SERVERS

(75) Inventors: Ramakrishna Vedantham, Sunnyvale, CA (US); Vidya Setlur, Cupertino, CA (US)

(73) Assignee: Nokia Corporation, Espoo (FI)

( * ) Notice: Subject to any disclaimer, the term of this patent is extended or adjusted under 35 U.S.C. 154(b) by 609 days.

(21) Appl. No.: 11/622,434

(22) Filed: Jan. 11, 2007

(65) Prior Publication Data
US 2007/0180133 A1    Aug. 2, 2007

Related U.S. Application Data

(60) Provisional application No. 60/758,256, filed on Jan. 11, 2006.

(51) Int. Cl.
*G06F 15/16* (2006.01)
(52) U.S. Cl. ......... 709/231; 709/203; 709/217; 709/238
(58) Field of Classification Search ............... 709/203, 709/217, 231, 238
See application file for complete search history.

(56) References Cited

U.S. PATENT DOCUMENTS

| 7,522,935 | B2 * | 4/2009 | Rey et al. .................. 455/522 |
| 2003/0005387 | A1 * | 1/2003 | Tsunoda .................. 714/785 |
| 2005/0086582 | A1 * | 4/2005 | Frojdh et al. ............. 715/501.1 |
| 2005/0216472 | A1 * | 9/2005 | Leon et al. ................. 707/10 |
| 2005/0216812 | A1 * | 9/2005 | Leon et al. ................. 714/748 |
| 2006/0193337 | A1 * | 8/2006 | Paila et al. ................. 370/432 |
| 2007/0157283 | A1 * | 7/2007 | Setlur et al. ............... 725/136 |
| 2007/0186005 | A1 * | 8/2007 | Setlur et al. ............... 709/231 |
| 2007/0192818 | A1 * | 8/2007 | Bourges-Sevenier et al. ....................... 725/132 |
| 2007/0281650 | A1 * | 12/2007 | Paila et al. ................ 455/230 |

FOREIGN PATENT DOCUMENTS

| WO | WO 2004/056096 | 7/2004 |
| WO | WO 2005/039131 | 4/2005 |
| WO | WO 2005/060339 | 7/2005 |

OTHER PUBLICATIONS

International Search Report for PCT Application PCT/IB2007/000073.

* cited by examiner

*Primary Examiner* — Phuoc Nguyen
(74) *Attorney, Agent, or Firm* — AlbertDhand LLP (57) ABSTRACT

An extension to the ISO Base Media File Format to support ALC as a broadcast protocol. The present invention also provides for the extension of the ESG to include metadata specific to the transport of SVG over mobile broadcast/multicast networks. A "BMFDP hint track" is introduced in the container file format, with the required file metadata being in these hint tracks. The present invention can be used in applications such as the preview of long cartoon animations, interactive Mobile TV services, live enterprise data feeds, live chat services, and karaoke programs.

33 Claims, 5 Drawing Sheets

FIG. 1

| Continuous Media (Video, Audio, SVG, Timed Text etc.) | Discrete Media (Images, Container Files etc.) |
|---|---|
| RTP | ALC or FLUTE |
| UDP ||
| IP ||
| BDS Bearer (3GPP MBMS or 3GPP2 BCMCS or DVB-H IPDC) ||

EXTENSIONS TO RICH MEDIA CONTAINER FORMAT FOR USE BY MOBILE BROADCAST/MULTICAST STREAMING SERVERS

FIELD OF THE INVENTION

The present invention relates generally to the extension of the ISO Base Media File Format to include Asynchronous Layered Coding (ALC) as a broadcast/multicast protocol while streaming rich media content. More particularly, the present invention relates to the inclusion of file session description protocol (SDP), metadata and hint tracks for broadcast/multicast downloading of rich media content using ALC.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Rich media content is generally referred to content that is graphically rich and contains compound (or multiple) media, including graphics, text, video and audio, and is preferably delivered through a single interface. The streaming of rich media content is becoming increasingly important for delivering visually rich content for real-time content, especially within the MBMS and Packet Switched Streaming (PSS) service architecture. Multimedia Broadcast Multicast Service (MBMS) streaming services facilitate resource-efficient delivery of popular real-time content to multiple receivers in a 3G mobile environment. The content may be pre-recorded or generated from a live feed.

There are currently several existing systems for representing rich media, particularly in the Web services domain. Scalable Vector Graphics (SVG) Mobile 1.2 is a language for describing two-dimensional graphics in XML. Scalable Vector Graphics allow for three types of graphic objects: vector graphic shapes (e.g., paths consisting of straight lines and curves), multimedia (such as raster images, video, etc.) and text. SVG drawings can be interactive (using the document object model (DOM) event model) and dynamic. Animations can be defined and triggered either declaratively (i.e., by embedding SVG animation elements in SVG content) or via scripting. Sophisticated applications of SVG are possible by the use of a supplemental scripting language which accesses the SVG Micro Document Object Model (uDOM), which provides complete access to all elements, attributes and properties. A rich set of event handlers can be assigned to any SVG graphical object. Because of its compatibility and leveraging of other Web standards (such as the compound documents format (CDF)), features like scripting can be performed on XHTML and SVG elements simultaneously within the same Web page.

The Synchronized Multimedia Integration Language (SMIL) version 2.0 enables the simple authoring of interactive audiovisual presentations. SMIL is typically used for "rich media"/multimedia presentations which integrate streaming audio and video with images, text or any other media type.

For CDF, there are currently efforts underway to combine separate component languages (e.g. XML-based languages, elements and attributes from separate vocabularies), such as XHTML, SVG, MathML, and SMIL, with a focus on user interface markups. When combining user interface markups, specific problems have to be resolved that are not addressed by the individual markups specifications. These issues include the propagation of events across markups and the combination of rendering or the user interaction model with a combined document.

Real-Time Transport Protocol (RTP) is currently the preferred transport layer protocol for the streaming delivery of continuous media, such as audio, video and SVG. RTP is used for unicast streaming (e.g., 3GPP PSS, 3GPP2 MSS (Multimedia Streaming Services)), broadcast/multicast streaming (e.g., 3GPP multimedia broadcast/multicast service (MBMS), 3GPP2 BCMCS (BroadCast MultiCast Services)) and rich media conferencing applications.

Figure 3:
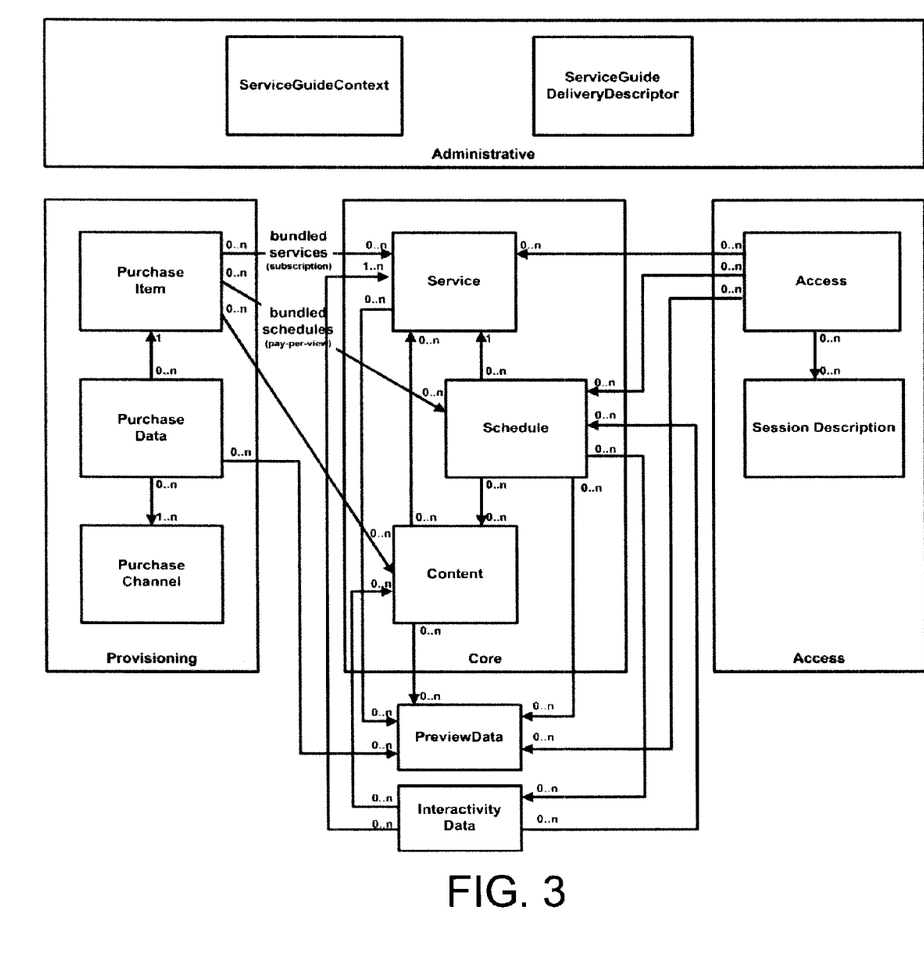
FIG. 3 is a representation of a conventional data model of the OMA BCAST ESG.

Asynchronous layered coding (ALC) is a massively scalable and reliable content delivery protocol. ALC is the base protocol for the reliable multicast delivery of arbitrary binary objects. ALC is adopted as the mandatory protocol for broadcast/multicast file delivery in 3GPP2 BCMCS and OMA BAC BCAST. The file metadata (that is carried as part of a File Delivery Table (FDT) in file delivery over unidirectional transport (FLUTE)) is now delivered to the clients as part of the OMA BCAST electronic service guide (ESG). This metadata is divided into various ESG fragments according to a service guide data model. The fragments are identified as: Service, Schedule, Content, Access, Session Description, Purchase Item, Purchase Data, Purchase Channel, Service Guide Context, Service Guide Delivery Descriptor and Preview Data. The OMA BCAST ESG data model is illustrated in prior art FIG. 3. The ESG is normally delivered to the clients well in advance of the ALC session. Therefore, clients have the file metadata before the ALC session starts. If the file metadata needs to be updated during the ALC session, then those fragments of ESG that contain the file metadata are updated by using the ESG delivery/update channels. Therefore, file metadata update is not performed in-band of the ALC session.

FLUTE builds on top of ALC and defines FDT that stores the metadata associated with the files being delivered in an ALC session. FLUTE also provides mechanisms for in-band delivery and updates of FDT. FLUTE is adopted by 3GPP MBMS and DVB-H IPDC as the mandatory protocol for broadcast/multicast file delivery.

In addition to the above, There also exists an ISO Base Media File container format for storage of rich media content and subsequent transport of such content over HTTP, FLUTE and RTP. These formats are discussed in detail in U.S. Provisional Patent Application No. 60/713,303, filed Sep. 1, 2005, and U.S. Provisional Patent Application No. 60/694,440, filed Jun. 27, 2005, both of which are incorporated herein by reference in their entirety. However, there are currently no mechanisms for including ALC as a broadcast protocol, particularly for storing file metadata in the ESG.

Until recently, applications for mobile devices were text-based with limited interactivity. However, as more wireless devices are coming equipped with color displays and more advanced graphics rendering libraries, consumers are increasingly demanding a rich media experience from all of their wireless applications. A real-time rich media content streaming service is imperative for mobile terminals, especially in the area of MBMS, PSS, and MMS services.

SVG is designed to describe resolution independent 2D vector graphics, allowing for interactivity using the event model and animation concepts borrowed from SMIL. SVG also allows for infinite zoomability and enhances the power of user interfaces on mobile devices. In addition, SVG supports embedding of media elements similar to SMIL media elements.

All the embedded media can be divided into two parts—discrete media (e.g. images) and continuous media (e.g. audio, video). Continuous media elements define their own timelines within their time container. SVG is therefore, gaining importance and becoming one of the core elements to drive a multimedia presentation, especially for rich media services such as Mobile TV, live updates of traffic information, weather, news, etc. SVG is XML-based, allowing for more transparent integration with other existing web technologies.

For rich media streaming over broadcast/multicast networks, RTP can be used to deliver continuous media such as audio, video and SVG scenes/updates. However and as discussed previously, SVG presentations also include discrete media, and it currently makes more sense to use file download protocols rather than RTP for the delivery of discrete media. ALC and FLUTE are currently the preferred transport layer protocols for file delivery over broadcast/multicast networks. A broadcast/multicast streaming server should be able to generate rich media packets (RTP and ALC, or RTP and FLUTE) by reading the contents from a rich media container file. A container file may include (1) media tracks for continuous media, i.e., SVG tracks, audio tracks, video tracks, raster images, etc.; (2) hint tracks that hold synchronization information; and (3) internally embedded discrete media.

A broadcast/multicast streaming server creates RTP packets to carry continuous media by using the media tracks and hint tracks. The server also needs to create ALC or FLUTE packets to carry internally embedded discrete media. The server may also decide to acquire some or all of the externally referenced discrete media, and send them to the clients using ALC or FLUTE. After reception, these images (a) could be rendered when the corresponding SVG content is being played or (b) can be locally stored/cached and rendered by user interaction. This results in a satisfactory user experience and does not require another simultaneous point-to-point (PtP) connection from the client. However, this optimization does not preclude the possibility of simultaneous PtP connections, but instead merely minimizes the need for simultaneous PtP connections. If these discrete media are not free to access, for example, CNN imagery, then the rich media application can make sure that the images are rendered only if the user buys them (i.e., the digital rights management (DRM) rights). Thus, the externally referenced discrete media files are broadcast to all users whether they subscribed to their access or not. The broadcast download of these files wastes radio and memory resources for users that do not subscribe to these files. For users that subscribe to these files, the broadcast download of these files reduces the usage of radio resources and also enhances their user experience. To create ALC or FLUTE packets, the server needs the metadata associated with the discrete media (image) files. This file metadata also needs to be included in the rich media container file.

SUMMARY OF THE INVENTION

The invention solves the problem of a lack of a mechanism for storing this metadata in the rich media container files. The present invention includes an extension to the ISO Base Media File Format to support ALC as a broadcast protocol, as well as the extension of the ESG to include metadata specific to the transport of SVG over mobile broadcast/multicast networks. A "BMFDP hint track" is introduced in the container file format, with the required file metadata being in these hint tracks.

There are several use cases for rich media services that can benefit from using ALC as a protocol. These uses include the preview of long cartoon animations, interactive Mobile TV services, live enterprise data feeds, live chat services, and karaoke programs. As there has been no previous solution to include ALC-specific content in the ISO Base Media File format, the inclusion of ALC facilitates greater leverage for being able to send out-of-band information during a rich media session to 3G mobile devices for downloading applications. Given the benefits for services offering interactive and dynamic rich media streaming and progressive downloading provided by the present invention, the invention can be incorporated into a wide variety of products, and the present invention can be used in services such as 3GPP MBMS, 3GPP2 BCMCS, DVB-H IPDC and OMA BCAST.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention includes an extension to the ISO Base Media File Format to support ALC as a broadcast protocol, as well as the extension of the ESG to include metadata specific to the transport of SVG over mobile broadcast/multicast networks. A "BMFDP hint track" is introduced in the container file format, with the required file metadata being in these hint tracks.

The implementation of the present invention involves the extension of the ISO Base Media File Format to support ALC protocol for transmission. This involves (1) adding session description information for ALC in the ISO Base Media File Format; (2) extending the ISO Base Media File Format to include metadata information for the ESG; and (3) extending the ISO Base Media File Format for including hint track information to form ALC packets for transmission.

Figure 1:
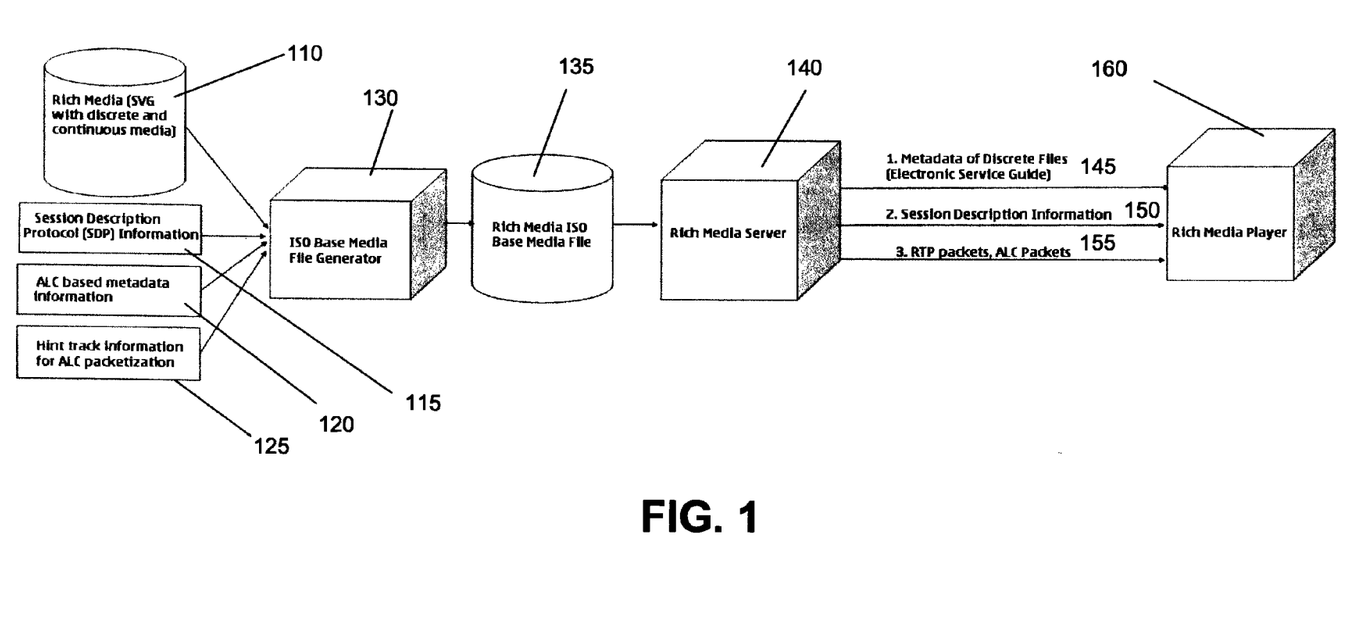
FIG. 1 is a representation showing how ALC-specific information can be included in the ISO Base Media File Format to realize a rich media broadcast/multicast streaming/download service using RTP and ALC protocols.
Figure 2:
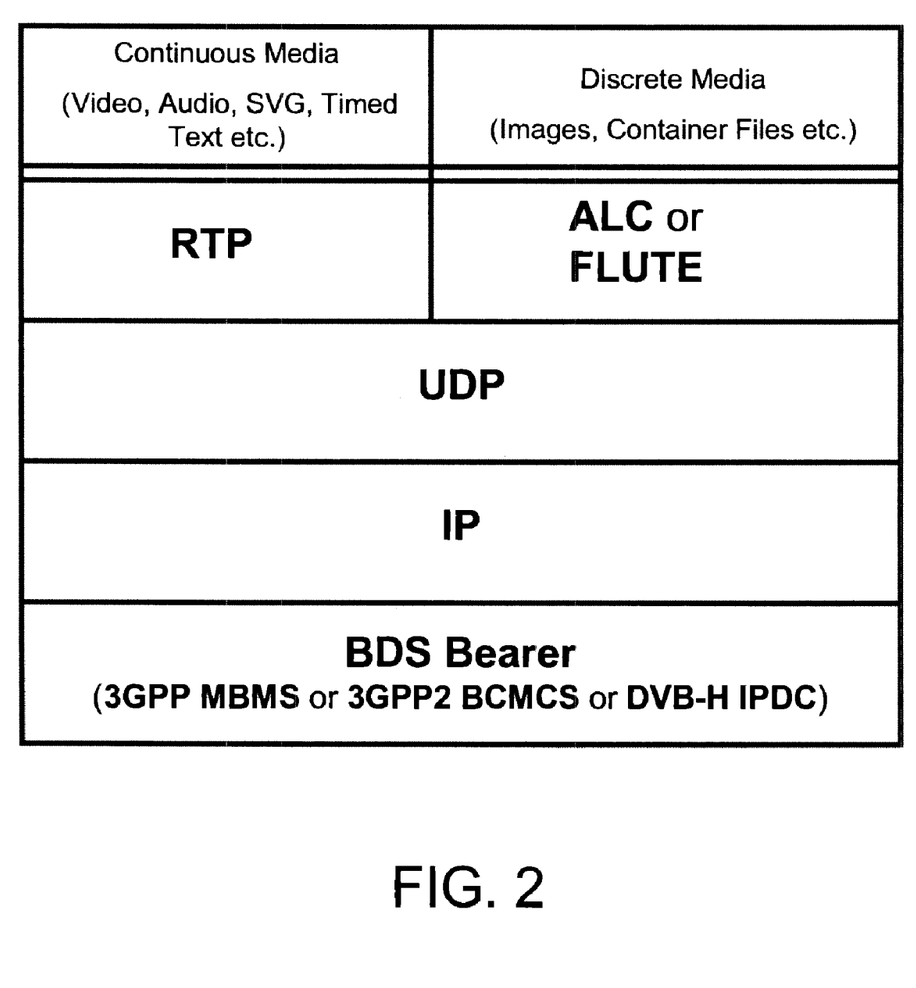
FIG. 2 is a representation of the protocol stack for rich media streaming and file downloading over mobile broadcast/multicast networks.

FIG. 1 is a representation of how ALC-specific information can be included in the ISO Base Media File Format to realize a rich media broadcast/multicast streaming/downloading service using RTP and ALC protocols. As can be observed in FIG. 1, rich media 110 (SVG with discrete and continuous media), SDP information 115, ALC-based metadata information 120, and hint track information for ALC packetization 125 is entered into an ISO Base Media File generator 130, which produces a rich media ISO Base Media File 135. The rich media ISO Base Media File 135 is provided to a rich media server 140. The rich media player 140 then transmits (1) metadata of discrete files (ESG) 145; (2) session description information 150; and (3) RTP and ALC packets 155 to a rich media player 160, which can then decode the encoded information for subsequent exhibition. FIG. 2 shows the protocol stack for rich media streaming and file downloading over mobile broadcast/multicast networks. It should be understood that, although text and examples contained herein may specifically describe an encoding process, one skilled in the art would readily understand that the same concepts and principles also apply to the corresponding decoding process and vice versa.

The following is a description of the capability of SVG to embed media, as well as the different transport scenarios for rich media transmission. This information provides a basis for the usage of ALC as a protocol for rich media download, as well as the scope of the issues addressed by the present invention. SVG supports media elements similar to SMIL media elements. As discussed above, all of the embedded media can be divided into two parts—discrete and continuous media. Discrete media such as images are embedded in SVG using the 'image' element, such as:

<image x="200" y="200" width="100px" height="100px" xlink:href="myimage.png">

Examples for including continuous media such as audio and video are as follows:
<audio xlink:href="1.ogg" volume="0.7" type="audio/vorbis" begin="mybutton.click" repeatCount="3"/>
<video xlink:href="ski.avi" volume=".8" type="video/x-ms-video" x="10" y="170"/>

SVG can also embed other SVG documents, which in turn can embed yet more SVG documents through nesting. The animation element specifies an external embedded SVG document or an SVG document fragment providing synchronized animated vector graphics. Like the video element, the animation element is a graphical object with size determined by its x, y, width and height attributes. The following is one such example:
<animation begin="1" dur="3" repeatCount="1.5" fill="freeze" x="100" y="100" xlink:href="mylcon.svg"/>

Similarly, the media in SVG can be internally or externally referenced. While the above examples are internally referenced, the following example shows externally referenced media:
<animate attributeName="xlink:href" values="http://www.example.com/images/1.png;
 http://www.example.com/images/2.png;
 http://www.example.com/images/3.png" begin="15s" dur="30s"/>

The embedded media elements can be linked through internal or external URLs in the SVG content. In this scenario, internal URLs refer to file paths within the ISO Base Media File itself. External URLs refer to file paths outside of the ISO Base Media File either present on the same server containing the source SVG file or on other servers. The present invention is directed to ALC transport mechanisms for internally embedded discrete media. Correspondingly, Session Description Protocol (SDP) is specified for internally embedded media.

The transport mechanisms discussed herein are provided for embedded discrete and continuous media residing on the same or another server. These media could be in raw or ISO Base Media File format. However, appropriate steps should be taken to ensure the proper synchronization of these media elements during transmission and presentation.

For download, both discrete and continuous embedded media can be transported by HTTP, FLUTE or ALC depending on whether it is point-to-point or broadcast. However, only the continuous media can be transported by RTP in a broadcast streaming scenario. For this reason, the following transport combinations are envisioned: (1) broadcast streaming+HTTP downloading of discrete media; (2) unicast streaming+HTTP downloading of discrete media; (3) broadcast streaming+FLUTE/ALC downloading of discrete media; and (4) unicast streaming+FLUTE/ALC downloading of discrete media. The present invention is directed to items (3) and (4). Furthermore, the discrete media files can be explicitly transmitted by transmitting them to the UE in advance via an ALC/FLUTE session; (2) transmitting them to each client on a point-to-point bearer before the streaming session, in a manner similar to the way security keys are sent to clients prior to an MBMS session; (3) having a parallel ALC/FLUTE transmission session independent of the RTP transmission session, if enough radio resources are available; or (4) having non-parallel transmission sessions to transmit all of the data due to the limited radio resources. Each transmission session contains either ALC/FLUTE data or RTP data.

The following is a description of a first implementation of the present invention, involving the use of boxes to store Session Description Protocol (SDP) information. SDP is a common practical format for specifying the session description. ALC packets can be used to transport the scene description, as well as discrete and/or continuous embedded media depending upon whether it is a pure download scenario or it is shared with an RTP streaming session. The URIs of the internally embedded media are indicated in the ESG that is sent prior to the beginning of the ALC session. The syntax of the SDP description for ALC is similar to that of FLUTE, and has been defined in the Internet-Draft: SDP Descriptors for FLUTE.

There may be various description formats for ALC. SDP is defined is defined below. The text present in SDP is correctly formatted as a series of lines, each terminated by <crlf>, as required by SDP. This case arises for the transmission of SVG scene and scene updates and discrete embedded media. Boxes for FLUTE at different levels (presentation, movie, track, item) are described in detail in U.S. Provisional Patent Application No. 60/713,303, filed Sep. 1, 2005. However, the same boxes can be generalized for broadcast download to include ALC as well. Therefore, boxes are prefixed with 'BMFDP' (Broadcast Multicast File Download Protocol) to be more generic to store SDP for either ALC or FLUTE SDP. A flag called 'protocol' is also added to indicate whether the boxes are being used for FLUTE or ALC. The boxes at the four different levels are as follows:

(a) Presentation BMFDP Information. A presentation level hint information container is defined within a 'phib' box, dedicated for ALC or FLUTE. This can be used when all of the content in the current presentation is sent via ALC or FLUTE.

```
aligned(8) class BMFDPpresentationhintinformation extends box('bdph') {
    uint protocol; // 0 for ALC, 1 for FLUTE
    uint(32) descriptionformat = 'sdp ';
    char sdptext[ ];
}
```

(b) Item BMFDP Information. An item level hint information container is defined within an 'ihib' box, dedicated for ALC or FLUTE. This can be used when all of the content in the current item is sent via ALC or FLUTE.

```
aligned(8) class BMFDPitemhintinformation extends box('bdih') {
    uint protocol; // 0 for ALC, 1 for FLUTE
    uint(32) descriptionformat = 'sdp ';
    char sdptext[ ];
}
```

(c) Movie Broadcast Download Information. A movie level hint information container is defined within a 'hnti' box, dedicated for ALC or FLUTE. This can be used when all of the content in the current movie is sent via ALC or FLUTE.

```
aligned(8) class BMFDPmoviehintinformation extends box('bdmh') {
    uint protocol; // 0 for ALC, 1 for FLUTE
    uint(32) descriptionformat = 'sdp ';
    char sdptext[ ];
}
```

(d) Track Broadcast Download Information. A track level hint information container is defined within the 'hnti' box, dedicated for ALC or FLUTE. This can be used when all of the content in the current track is sent via ALC or FLUTE.

```
aligned(8) class BMFDPtrackhintinformation extends box('bdth') {
    uint protocol; // 0 for ALC, 1 for FLUTE
    uint(32) descriptionformat = 'sdp ';
    char sdptext[ ];
}
```

In the ALC+RTP transport system, the SDP information for the ALC and RTP stream may be combined together. This case may occur when SVG media contains both discrete and continuous embedded media. The discrete media is transmitted via ALC, and continuous media is transmitted via RTP. The SDP information can then be saved in the following boxes. U.S. Provisional Patent Application No. 60/713,303, filed Sep. 1, 2005 defines boxes for FLUTE+RTP at different levels (e.g., presentation, movie, item). However, the same boxes can be generalized for broadcast download to include ALC as well. Therefore, boxes are prefixed with 'BMFDP' to be more generic to store SDP for ALC+RTP or FLUTE+RTP SDP. A flag called 'protocol' indicates whether the boxes are being used for FLUTE or ALC. The boxes at the three different levels are as follows:

(a) Presentation SDP Information.

```
aligned(8) class BMFDPrtppresentationhintinformation extends box('bdrp') {
    uint protocol; // 0 for ALC, 1 for FLUTE
    uint(32) descriptionformat = 'sdp ';
    char sdptext[ ];
}
```

(b) Movie SDP Information.

```
aligned(8) class BMFDPrtpmoviehintinformation extends box('bdrm') {
    uint protocol; // 0 for ALC, 1 for FLUTE
    uint(32) descriptionformat = 'sdp ';
    char sdptext[ ];
}
```

(c) Item SDP Information.

```
aligned(8) class BMFDPrtpitemhintinformation extends box('bdri') {
    uint protocol; // 0 for ALC, 1 for FLUTE
    uint(32) descriptionformat = 'sdp ';
    char sdptext[ ];
}
```

A second implementation of the present invention involves the use of boxes to store metadata information. In order to transmit internally embedded discrete media using broadcast/multicast file download protocol (ALC/FLUTE), it is required for the server to also transmit some metadata corresponding to the discrete media. Hence, this implementation of the invention involves the encapsulation of this metadata in the ISO Base Media File Format.

The metadata is sent as part of the FDT if FLUTE is used as a broadcast protocol, or the metadata is sent as part of OMA BCAST ESG if ALC is used in conjunction with OMA BCAST ESG. The ESG provides a mechanism for describing various metadata associated with files that are to be delivered through ALC in the Digital Mobile Broadcast Service. In addition, the ESG specifies the use of Service Guide Delivery Units (SGDUs) and Service Guide Delivery Descriptors (SGDDs) for consistent control of the ESG while it is being downloaded via PtM and/or PtP channels.

Metadata updated during broadcast/multicast file download can be performed either in-band or out-of-band. In-band metadata updates are performed using FDT of FLUTE, where the FDT Instance ID identifies the latest version of the metadata in FDT. If the metadata is signaled as an SGDU object in ALC, then the ESG is updated according to the SGDU or SG fragment versioning system. There are two options for the PtM transport of the new SGDU. With the first option, the new SGDU object is sent in a separate ALC session. With the second option, the new SGDU object is added to the same ALC session as the original ALC session.

U.S. Provisional Patent Application No. 60/713,303 describes the extension of the ISO Base Media File format by defining boxes to store the data of FDT instances. However, the same boxes can be generalized to store metadata for broadcast download, including ALC as well. As in the first implementation, the boxes are prefixed with 'BMFDP' to be more generic to store metadata for broadcast/multicast downloads. These file parameters are required by any protocol used for broadcast/multicast downloading. Boxes are defined for all of the four levels—presentation, movie, track and item as depicted below.

(a) Presentation Metadata Information. A presentation level metadata container is defined within 'bdph' or 'bdrp' boxes, dedicated for ALC/FLUTE or ALC/FLUTE+RTP transport schemes, respectively.

```
aligned(8) class BMFDPpresentationmetadatainformation extends box('bmpm') {
    String        Content-Location;
    unsignedLong  Content-Length;
    unsignedLong  Transfer-Length;
    String        Content-Type'
```

```
    String        Content-Encoding;
    Base64Binary  Content-MD5;
}
```

The Content-Location of embedded media resources may be referred by using the URL forms defined in Section 8.44.7 in ISO/IEC 15444-12:2005.

(b) Item Metadata Information. An item level metadata container is defined within 'bdih' or 'bdri' boxes, dedicated for ALC/FLUTE or ALC/FLUTE+RTP transport schemes, respectively.

```
aligned(8) class BMFDPitemmetadatainformation extends box('bmim') {
    String        Content-Location;
    unsignedLong  Content-Length;
    unsignedLong  Transfer-Length;
    String        Content-Type'
    String        Content-Encoding;
    Base64Binary  Content-MD5;
}
```

(c) Movie Metadata Information. A movie level metadata container is defined within the 'hnti' box, dedicated for ALC/FLUTE.

```
aligned(8) class BMFDPmoviemetadatainformation extends
box('bmmm') {
    String        Content-Location;
    unsignedLong  Content-Length;
    unsignedLong  Transfer-Length;
    String        Content-Type'
    String        Content-Encoding;
    Base64Binary  Content-MD5;
}
```

(d) Track Metadata Information. A track level metadata container is defined within the 'bdth' box, dedicated for ALC/FLUTE. This can be used when all of the content in the current track is sent via ALC/FLUTE.

```
aligned(8) class BMFDPtrackmetadatainformation extends box('bmtm') {
    String        Content-Location;
    unsignedLong  Content-Length;
    unsignedLong  Transfer-Length;
    String        Content-Type'
    String        Content-Encoding;
    Base64Binary  Content-MD5;
}
```

A third implementation of the present invention involves the use of boxes to store hint track information. The hint track structure is generalized to support hint samples in multiple data formats. The hint track sample contains any data needed to build the packet header of the correct type. The hint track sample also contains a pointer to the block of data that belongs in the packet. Such data can be SVG, continuous embedded media, and discrete embedded media.

Hint track samples are not part of the hint track box structure, although they are usually found in the same file. The hint track data reference box ('dref') and sample table box ('stbl') are used to find the file specification and byte offset for a particular sample. Hint track sample data is byte-aligned and is always in big-endian format.

The following is a discussion of the hint track format for ALC. U.S. Provisional Patent Application No. 60/713,303 describes boxes for FLUTE hint track information at different levels (e.g., presentation, movie, track, item). However, the same boxes can be generalized for broadcast download to include ALC as well. Hence, boxes can be prefixed with 'BMFDP' to be more generic to store hint track information for either ALC or FLUTE.

Similar to the hierarchy of RTP hint track, the BMFD-PHintSampleEntry and BMFDPsample are defined. In addition, some related structures and constructors are also defined. A 'protocol' is also added to indicates whether the boxes are being used for FLUTE or ALC.

(a) Sample Description Format. BMFDP hint tracks are hint tracks (media handler 'hint') with an entry-format in the sample description of 'bmfd'. The BMFDPHintSampleEntry is contained in the SampleDescriptionBox ('stsd').

```
class BMFDPHintSampleEntry( ) extends SampleEntry (bmfd') {
    uint protocol; // 0 for ALC, 1 for FLUTE
    uint(16)  hinttrackversion = 1;
    uint(16)  highestcompatibleversion = 1;
    uint(32)  maxpacketsize;
    box       additionaldata[ ];  //optional
}
```

The fields "hinttrackversion", "highestcompatibleversion" and "maxpacketsize" have the same interpretation as that in the "RtpHintSampleEntry" described in section 10.2 of the ISO/IEC 15444-12:2005 specification. The additional data is a set of boxes from "timescaleentry" and "timeoffset", which are referenced in ISO/IEC 15444-12:2005 section 10.2. These boxes are optional for ALC/FLUTE.

(b) Sample Format. Each BMFDPsample in the hint track will generate one or more BMFDP packets, respectively. Compared to RTP samples, BMFDPsamples do not have their own specific timestamps, but instead are sent sequentially. Considering the sample-delta saved in the TimeToSample-Box, if the BMFDP samples represent fragments of the embedded media or SVG content, then the sample-delta between first sample of current media/SVG and the final sample of previous media/SVG has the same value as the difference between start-time of the scene/update to which current and previous media/SVG belong. The sample-deltas for the rest of the successive samples in current media/SVG are zero. However, if a BMFDP sample represents an entire media or SVG content, then there will be no successive samples (containing the successive data from the same media/SVG) with deltas equal to zero following this BMFDP sample. Therefore, only one sample-delta is present for current BMFDP sample.

Each sample contains two areas—the instructions to compose the packets, and any extra data needed when sending those packets (e.g. an encrypted version of the media data). It should be noted that the size of the sample is known from the sample size table.

```
aligned(8) class BMFDPsample {
    uint protocol; // 0 for ALC, 1 for FLUTE
    unsigned int(16)   packetcount;
    unsigned int(16)   reserved;
    BMFDPpacket packets[packetcount];
    byte        extradata[ ];      //optional
}
```

(c) Packet Entry Format. Each packet in the packet entry table has the following structure:

```
aligned(8) class BMFDPpacket {
    uint protocol;  // 0 for ALC, 1 for FLUTE
    BMFDPheader  bmfdp_header;
    unsigned int(16)  entrycount;
    dataentry    constructors[entrycount];
}
```

The "bmfdp_header" contains the header for current BMFDP packet. The "entry_count" is the count of following constructors, with a constructor being a structure which is used to construct the BMFDP packets.

```
aligned(8) class BMFDPheader {
    uint protocol;  // 0 for ALC, 1 for FLUTE
    UDPheader   header;
    LCTheader   lct_header;
    variable    FEC_payload_ID;
}
```

The FEC_payload_ID is determined by the FEC Encoding ID that must be communicated in the Session Description.

```
class pseudoheader {
    unsigned int(32) source_address;
    unsigned int(32) destination_address;
    unsigned int(8) zero;
    unsigned int(8) protocol;
    unsigned int(16) UDP_length;
}
class UDPheader {
    pseudoheader pheader;
    unsigned int(16) source_port;
    unsigned int(16) destination_port;
    unsigned int(16) length;
    unsigned int(16) checksum;
}
class LCTheader {
    unsigned int(4) V_bits;
    unsigned int(2) C_bits;
    unsigned int(2) reserved;
    unsigned int(1) S_bit;
    unsigned int(2) O_bits;
    unsigned int(1) H_bit;
    unsigned int(1) T_bit;
    unsigned int(2) R_bit;
    unsigned int(2) A_bit;
    unsigned int(2) B_bit;
    unsigned int(8) header_length;
    unsigned int(8) codepoint
    unsigned int((C_bits+1)*32) congestion_control_information;
    unsigned int(S_bit*32 + H_bit*16) transport_session_identifier;
    unsigned int(O_bits*32 + H_bit*16) transport_object_identifier; //For EXT_FDT, TOI=0
    if (T_bit == 1) {
        unsigned int(32) sender_current_time;
    }
    if (T_bit == 1) {
        unsigned int(32) expected_residual_time;
    }
    if (header_length > (32 + (C_bits+1)*32 + S_bit*32 + H_bit*16 + O_bits*32 + H_bit*16) ) {
        LCTheaderextentions header_extention;
    }
}
class LCTheaderextentions {
    unsigned int(8) header_extention_type; //192-EXT_FDT, 193-EXT_CENC, 64-EXT_FTI
    if (header_extention_type <= 127) {
        unsigned int(8) header_extention_length;
    }
    if (header_extention_type == 64) {
        unsigned int(48) transfer_length;
        if ((FEC_encoding_ID == 0)||(FEC_encoding_ID == 128)||(FEC_encoding_ID == 130)) {
            unsigned int(16) encoding_symbol_length;
            unsigned int(32) max_source_block_length;
        }
        else if ((FEC_encoding_ID >= 128)||(FEC_encoding_ID <= 255)) {
            unsigned int(16) FEC_instance_ID;
        }
        else if (FEC_encoding_ID == 129) {
            unsigned int(16) encoding_symbol_length;
            unsigned int(16) max_source_block_length;
            unsigned int(16) max_num_of_encoding_symbol;
        }
    }
}
```

```
    else if (header_extention_type == 192) {
        unsigned int(4) version = 1;
        unsigned int(20) FDT_instance_ID;
    }
    else if (header_extention_type == 193) {
        unsigned int(8) content_encoding_algorithm; //ZLIB,DEFLATE,GZIP
        unsigned int(16) reserved = 0;
    }
    else {
        byte other_extentions_content[ ];
    }
}
```

The FEC_encoding_ID used below must be signalled in the session description. The header_extension type=64 is valid for both ALC and FLUTE. It is used for EXT_FTI, the header extension that carries the FEC Object Transmission Information. The header_extension type=192 is valid only for FLUTE. It is used for EXT_FDT, the header extension that informs that the particular FLUTE packet contains the FDT Instance as a payload, rather than the file. The header_extension type=193 is valid only for FLUTE. It is used for EXT_CENC, the header extension that indicates the content encoding used by the FDT Instance.

(d) Constructor Format. There are various forms of the constructor. Each constructor is 16 bytes in order to make iteration easier. The first byte is a union discriminator. This structure is based on section 10.3.2 from ISO/IEC 15444-12: 2005.

```
aligned(8) class BMFDPconstructor(type) {
    uint protocol; // 0 for ALC, 1 for FLUTE
    unsigned int(8) constructor_type = type;
}
aligned(8) class BMFDPnoopconstructor extends BMFDPconstructor(0)
{
    uint(8) pad[15];
}
aligned(8) class BMFDPimmediateconstructor extends
BMFDPconstructor(1)
{
    unsigned int(8) count;
    unsigned int(8) data[count];
    unsigned int(8) pad[14 – count];
}
aligned(8) class BMFDPsampleconstructor extends BMFDPconstructor(2)
{
    signed int(8)   trackrefindex;
    unsigned int(16) length;
    unsigned int(32) samplenumber;
    unsigned int(32) sampleoffset;
    unsigned int(16) bytesperblock = 1;
    unsigned int(16) samplesperblock = 1;
}
aligned(8) class BMFDPsampledescriptionconstructor extends
BMFDPconstructor(3)
{
    signed int(8)   trackrefindex;
    unsigned int(16) length;
    unsigned int(32) sampledescriptionindex;
    unsigned int(32) sampledescriptionoffset;
    unsigned int(32) reserved;
}
aligned(8) class BMFDPitemconstructor extends BMFDPconstructor(4)
{
    unsigned int(16) item_ID;
    unsigned int(16) extent_index;
    unsigned int(64) data_offset;   //offset in byte within extent
    unsigned int(32) data length;   //length in byte within extent
}
aligned(8) class BMFDPxmlboxconstructor extends BMFDPconstructor(5)
{
    unsigned int(64) data_offset;   //offset in byte within XMLBox
      or BinaryXMLBox
    unsigned int(32) data_length;
    unsigned int(32) reserved;
}
```

FDT data is one part of the whole FLUTE/ALC data stream. This data is either transmitted in-band during the FLUTE session in the form of FLUTE packets, or out-of-band during an ALC session using ESG or by other means. A constructor defined herein is used to map SGDU to the ALC packet. The syntax of the constructor is provided as follows:

```
aligned(8) class ALCsgduconstructor extends BMFDPconstructor(6)
{
    unsigned int(2) sgdu_box;           //0-'sgdp', 1-'sgdm',
      2-'sgdi', 3-'sgdt'
    if ((sgdu_box==0)||(sgdu_box==1)||(sgdu_box==2)) {
        unsigned int(30) instance_index; //index of the SGDU
        unsigned int(64) data_offset;   //offset in byte within
          the given SGDU
        unsigned int(32) data_length;   //length in byte within
          the given SGDU
    } else {
        unsigned int(64) data_offset;   //offset in byte within the
          given SGDU box
        unsigned int(32) data_length;   //length in byte within the
          given SGDU box
        bit      pad[30];               //padding bits
    }
}
```

The following is a discussion of the use of hint tracks for ALC+RTP. In the case that both RTP and BMFDP (ALC/FLUTE) packets are transmitted simultaneously during a presentation, both constructors for RTP and BMFDP are used. RTP packets are used to transmit the continuous media and SVG content, while BMFDP packets are used to transmit the discrete media. A different hint system is used for this case. Such a system can combine all of the RTP and BMFDP samples in a correct time order.

U.S. Provisional Patent Application No. 60/713,303 describes boxes for FLUTE+RTP hint track information at different levels. However, the same boxes can be generalized for broadcast download to include ALC as well. Hence, the boxes below are prefixed with 'BMFDP' to be more generic.

In order to facilitate the generation of BMFDP and RTP packets for a presentation, the hint track format for BMFDP+RTP is defined below. Similar to the hierarchy of RTP and BMFDP hint track, the BMFDPRtpHintSampleEntry and BMFDPRTPsample are defined. In addition, the data in TimeToSampleBox gives the time information for each packet.

(a) Sample Description Format. BMFDP+RTP hint tracks are hint tracks (media handler 'hint') with an entry-format in the sample description of 'frhs': BMFDPRtpHintSampleEntry is defined within the SampledDescriptionBox 'stsd'

```
class BMFDPRtpHintSampleEntry( ) extends SampleEntry ('brhs') {
    uint protocol; // 0 for ALC, 1 for FLUTE
    uint(16)  hinttrackversion = 1;
    uint(16)  highestcompatibleversion = 1;
    uint(32)  maxpacketsize;
    box additionaldata[ ];
}
```

The hinttrackversion is currently 1. The highest compatible version field specifies the oldest version with which this track is backward compatible. The maxpacketsize indicates the size of the largest packet that this track will generate. The additional data is a set of boxes ('tims', and 'tsro') which are defined in the ISO Base Media File Format.

(b) Sample Format. BMFDPRTPSample is defined within the MediaDataBox ('mdat'). This box contains multiple BMFDP samples, RTP samples, possible FDT/SGDU and SDP information and any extra data. One BMFDPRTP-Sample may contain either one FDT/SGDU data, SDP data, BMFDP sample, or RTP sample. BMFDPRTPSamples that contain BMFDP samples are used here only to transmit the discrete media. Such media are always embedded in the Scene or Scene Update among the SVG presentation. Their start-times are the same as the start-time of Scene/Scene Update they belong to. BMFDP samples do not have their own specific timestamps, but instead are sent sequentially, immediately after the RTP samples of the Scene/Scene Update they belong to. Therefore in the TimeToSampleBox, the sample-deltas of the BMFDPRTPSample for discrete media are all set to zero. Their sequential order represents their sending-time order.

UE may have limited power and can support only one transmission session at any time instant, and the BMFDP sessions and RTP sessions need to be interleaved one by one. One shall be started immediately after the other is finished. In this case, the description_text1, description_text2 and description_text3 fields below are used to provide SDP and FDT/SGDU information for each session.

```
aligned(8) class BMFDPRTPSample {
    uint protocol; // 0 for ALC, 1 for FLUTE
    unit(2)         sample_type;
    unsigned int(6)  reserved;
    if (sample_type == 0) {
    //FDT instance info for the FLUTE samples or SGDU info for the
    ALC //samples
        char        metadatatext[ ];
    }
    else if (sample_type == 1) {
        char        sdptext[ ]; //SDP info for the samples
    }
    else if (sample_type == 2 && protocol == 0) {
        BMFDPsample alc_sample;
    }
    else if (sample_type == 2 && protocol == 1) {
        BMFDPsample flute_sample;
    }
    else {
        RTPsample   rtp_sample;
    }
    byte extradata[ ];
}
```

In addition to the above, there are several other potential implementations of the present invention. The following are a discussion of some such alternative implementations. A fourth implementation of the present invention is similar to the first implementation discussed above. However, other description formats such as DCCPtext may be stored, in which case the sdptext field will change accordingly. A fifth implementation is similar to the second implementation. However, in this embodiment, a single fragment field can contain all of the fragment data in the ESG. The application can then choose to either split this data into different fields for all levels or for files.

There are several potential implementations of the present invention is similar in many respects to the third implementation discuss above, with various differences. For example, one may redefine the 'hnti' box at other levels, for example to contain presentation-level or item-level session information. For a sample description format for hint track information for ALC, the hinttrackversion and highestcompatibleversion fields may have different values, and a minpacketsize field may be added in addition to the maxpacketsize field. For sample formats for the hint track format for ALC, the packetcount field can be made 32 bits by removing the reserved field. For the packet entry format for the hint track format for ALC, the hierarchical structure of the different header boxes (BMFDPheader, UDPheader, LCTheader, etc.) could be different. For the constructor format for the hint track format for ALC, the ALCsgdutconstructor syntax can have separate field definitions for each sgdu_box, the BMFDPitemconstructor may have item_id replaced by item_name, the BMFDPxmlboxconstructor can have the data_length field to be made to 64 bytes by removing the reserved field, and the BMFDPxmlboxconstructor can have the data_length field to be made to 16 bytes and adjust reserved field to 64 bytes. For hint tracks for ALC+RTP, the BMFDPRtpHintSampleEntry can have the hinttrackversion and highestcompatibleversion fields to be of different values, the BMFDPRtpHintSampleEntry can add a minpacketsize field in addition to the maxpacketsize field, and the BMFDPRTPSample box can have separate field definitions for each sample_type.

There are several use cases for rich media services that can benefit from using ALC as a protocol. A first such use case involves the preview of long cartoon animations. The service of the present invention allows an end-user to progressively download small portions of each animation before deciding which one he or she wishes to view in its entirety.

A second use case for the present invention involves interactive Mobile TV services. With the present invention a deterministic rendering and behavior of rich-media content can be delivered together in the end user interface. The content can include audio-video content, text, graphics, images, and TV and radio channels. The service must provide convenient navigation through content in a single application or service, and the service must allow synchronized interaction in local or in distant settings, such as voting and personalization (e.g., related menus or sub-menus, advertising and content in function of the end-user profile or service subscription). This use case is described in four steps corresponding to four services and sub-services available in an iTV mobile service—a mosaic menu showing the TV channel landscape, an electronic program guide and triggering of a related iTV service, the iTV service, and personalized menus, such as "sports news."

A third use case for the present invention involves the use of a live enterprise data feed. This service includes, for example, stock tickers that provide streaming of real-time quotes, intra-day charts with technical indicators, news monitoring, weather alerts, charts, business updates, sports scores, etc.

A fourth use case for the present invention involves live chat services. Live chat services can be incorporated within a web cam, video channel, or a rich-media blog service. End-users can register, save their surname and exchange messages. Messages appear dynamically in the live chat service, along with rich-media data provided by the end-user. The chat service can be either private or public in one or more multiple channels at the same time. End users are dynamically alerted of new messages from other users. Dynamic updates of messages within the service occur without reloading a complete page.

A fifth use case for the present invention involves karaoke services. Karaoke services display a music TV channel or video clip catalog, along with the speech of a song with fluid-like animation on the text characters to be singing (e.g., a smooth color transition of fonts, scrolling of text, etc.) The end-user can download a song of his or her choice, along with the complete animation by selecting an interactive button. Similar systems can also be used for the reenactment of movie or television shows or clips.

Figure 4:
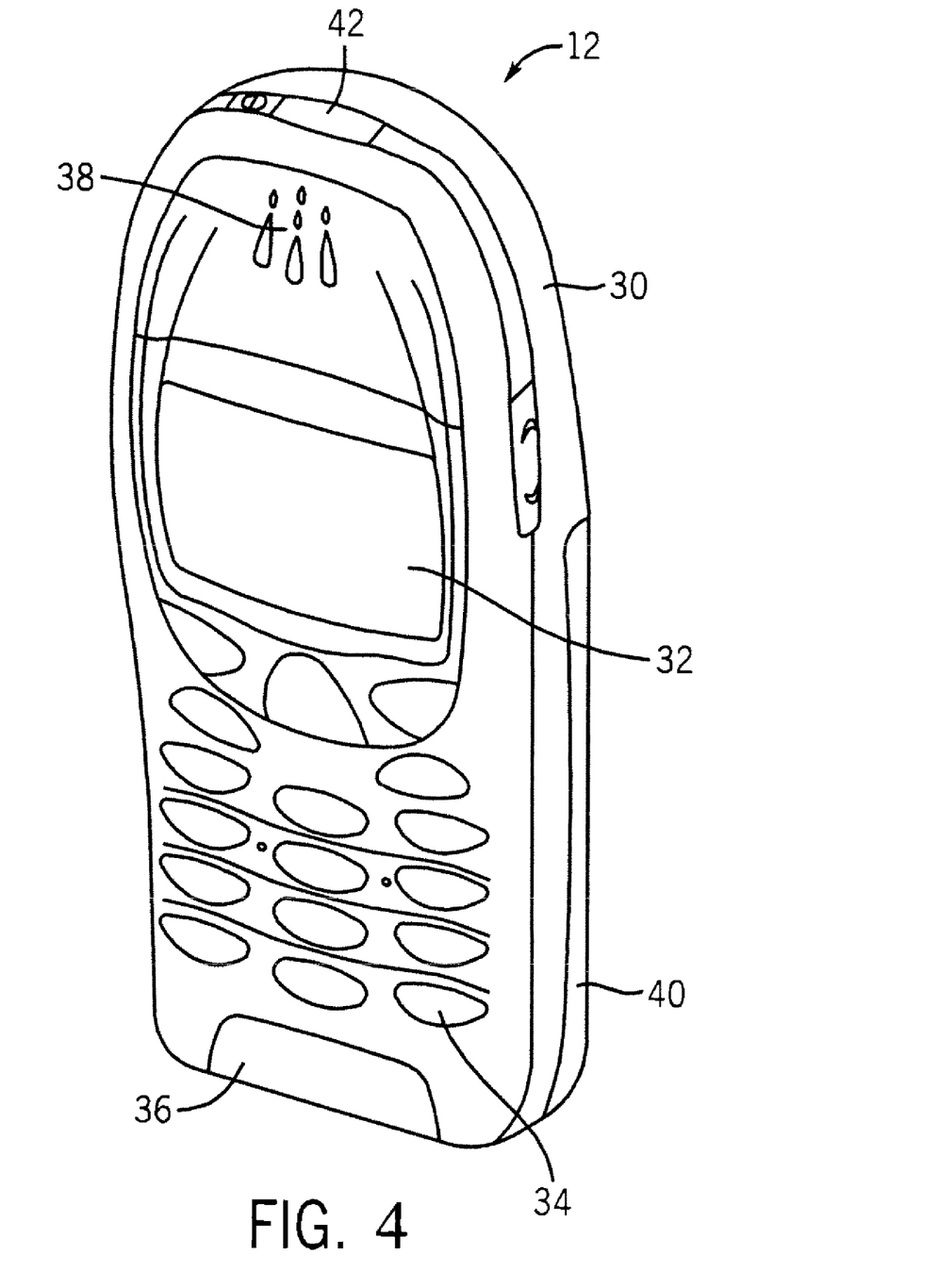
FIG. 4 is a perspective view of an electronic device that can be used in the implementation of the present invention.
Figure 5:
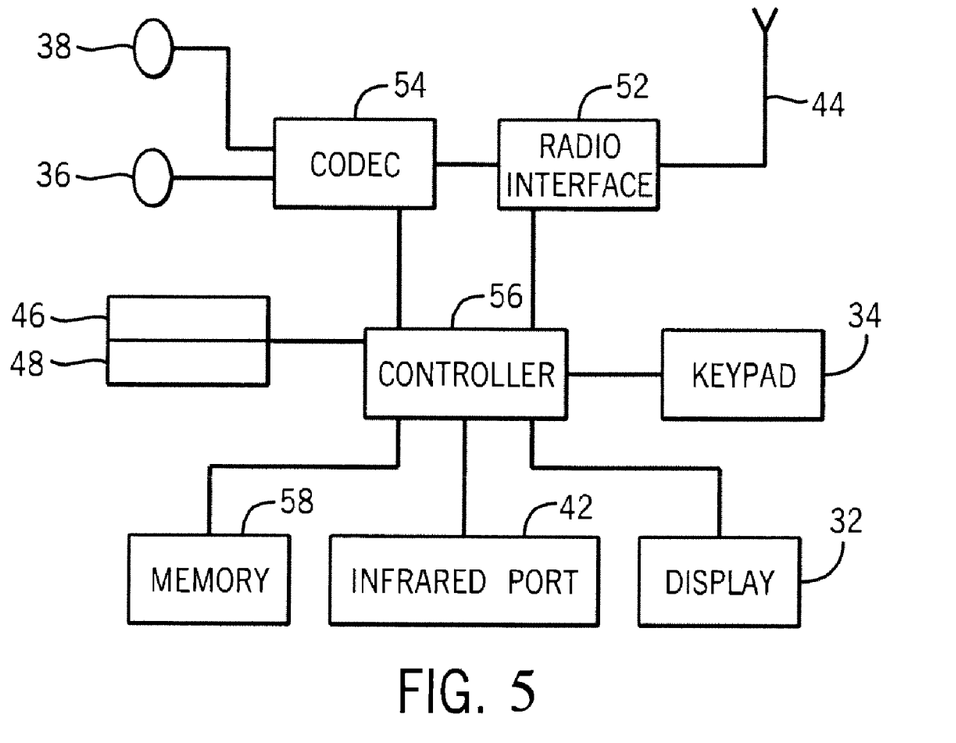
FIG. 5 is a schematic representation of the telephone circuitry of the mobile telephone of FIG. 4.

FIGS. 4 and 5 show one representative electronic device 12 within which the present invention may be implemented. It should be understood, however, that the present invention is not intended to be limited to one particular type of electronic device. The electronic device 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for progressively providing rich media content to a client device, comprising:
    encoding an ISO Base Media File, in accordance with an ISO Base Media File container format for storage of rich media content, from input information including:
        scalable vector graphics,
        file metadata information for one of ALC and FLUTE, and
        hint track information for one of ALC and FLUTE packetization; and
    transmitting the encoded ISO Base Media File in a plurality of RTP packets and packets selected from the group consisting of ALC packets and FLUTE packets to the client device, the ISO Base Media File including metadata of discrete files.

2. The method of claim 1, wherein the input information further includes session description protocol (SDP) information for one of ALC and FLUTE, and wherein the ISO Base Media File further includes session description information.

3. The method of claim 1, wherein the ISO Base Media File includes a plurality of SDP boxes for containing either ALC or FLUTE information.

4. The method of claim 3, wherein the scalable vector graphics contain both discrete and continuous media, and wherein the ISO Base Media File includes a plurality of SDP boxes for containing either ALC or FLUTE information, in addition to RTP information.

5. The method of claim 1, wherein the ISO Base Media File includes a plurality of SDP boxes for containing either ALC or FLUTE metadata information.

6. The method of claim 5, wherein the scalable vector graphics contain both discrete and continuous media, and wherein the plurality of SDP boxes are for containing either ALC or FLUTE information, in addition to RTP metadata information.

7. The method of claim 1, wherein the ISO Base Media File includes a plurality of SDP boxes for containing either ALC or FLUTE hint track information.

8. The method of claim 7, wherein the scalable vector graphics contain both discrete and continuous media, and wherein the plurality of SDP boxes are for containing either ALC or FLUTE information, in addition to RTP hint track information.

9. A computer program product, embodied on a non-transitory computer-readable medium, for progressively providing rich media content to a client device, comprising:
    computer-executable program code for encoding an ISO Base Media File, in accordance with an ISO Base Media File container format for storage of rich media content, from input information including:
        scalable vector graphics,
        file metadata information for one of ALC and FLUTE, and
        hint track information for one of ALC and FLUTE packetization; and
    computer-executable program code for transmitting the encoded ISO Base Media File in a plurality of RTP packets and packets selected from the group consisting of ALC packets and FLUTE packets to the client device, the ISO Base Media File including metadata of discrete files.

10. The computer program product of claim 9, wherein the input information further includes session description protocol (SDP) information for one of ALC and FLUTE, and wherein the ISO Base Media File further includes session description information.

11. The computer program product of claim 9, wherein the ISO Base Media File includes a plurality of SDP boxes for containing either ALC or FLUTE information.

12. The computer program product of claim 11, wherein the scalable vector graphics contain both discrete and continuous media, and wherein the ISO Base Media File includes a plurality of SDP boxes for containing either ALC or FLUTE information, in addition to RTP information.

13. The computer program product of claim 9, wherein the ISO Base Media File includes a plurality of SDP boxes for containing either ALC or FLUTE metadata information.

14. The computer program product of claim 13, wherein the scalable vector graphics contain both discrete and continuous media, and wherein the ISO Base Media File includes a plurality of SDP boxes for containing either ALC or FLUTE information, in addition to RTP metadata information.

15. The computer program product of claim 9, wherein the ISO Base Media File includes a plurality of SDP boxes for containing either ALC or FLUTE hint track information.

16. The computer program product of claim 15, wherein the scalable vector graphics contain both discrete and continuous media, and wherein the ISO Base Media File includes a plurality of SDP boxes for containing either ALC or FLUTE information, in addition to RTP hint track information.

17. An electronic device, comprising:
a processor; and
a memory unit communicatively connected to a processor and including:
computer code for encoding an ISO Base Media File, in accordance with an ISO Base Media File container format for storage of rich media content, from input information including:
scalable vector graphics,
file metadata information for one of ALC and FLUTE, and
hint track information for one of ALC and FLUTE packetization; and
computer code for transmitting the encoded ISO Base Media File in a plurality of RTP packets and packets selected from the group consisting of ALC packets and FLUTE packets to the client device, the ISO Base Media File including metadata of discrete files.

18. The electronic device of claim 17, wherein the input information further includes session description protocol (SDP) information for one of ALC and FLUTE, and wherein the ISO Base Media File further includes session description information.

19. The electronic device of claim 17, wherein the ISO Base Media File includes a plurality of SDP boxes for containing either ALC or FLUTE information.

20. The electronic device of claim 19, wherein the scalable vector graphics contain both discrete and continuous media, and wherein the ISO Base Media File includes a plurality of SDP boxes for containing either ALC or FLUTE information, in addition to RTP information.

21. The electronic device of claim 17, wherein the ISO Base Media File includes a plurality of SDP boxes for containing either ALC or FLUTE metadata information.

22. The electronic device of claim 21, wherein the scalable vector graphics contain both discrete and continuous media, and wherein the ISO Base Media File includes a plurality of SDP boxes for containing either ALC or FLUTE information, in addition to RTP metadata information.

23. The electronic device of claim 17, wherein the ISO Base Media File includes a plurality of SDP boxes for containing either ALC or FLUTE hint track information.

24. The electronic device of claim 23, wherein the scalable vector graphics contain both discrete and continuous media, and wherein the ISO Base Media File includes a plurality of SDP boxes for containing either ALC or FLUTE information, in addition to RTP hint track information.

25. A method of exhibiting rich media content on a client device, comprising:
receiving from a rich media server an ISO Base Media File containing rich media content in a plurality of RTP packets and a plurality of packets selected from the group consisting of ALC packets and FLUTE packets, the ISO Base Media File including metadata of discrete files;
decoding the ISO Base Media File; and
playing the decoded ISO Base Media File,
wherein the ISO Base Media File is generated from scalable vector graphics containing both discrete and continuous media, and wherein the ISO Base Media File includes a plurality of SDP boxes for containing either ALC or FLUTE information, in addition to RTP information.

26. The method of claim 25, wherein the ISO Base Media File further includes session description information.

27. The method of claim 25, wherein the ISO Base Media File includes a plurality of SDP boxes for containing either ALC or FLUTE metadata information.

28. The method of claim 27, wherein the ISO Base Media File is generated from scalable vector graphics containing both discrete and continuous media, and wherein the ISO Base Media File includes a plurality of SDP boxes for containing either ALC or FLUTE information, in addition to RTP metadata information.

29. The method of claim 25, wherein the ISO Base Media File includes a plurality of SDP boxes for containing either ALC or FLUTE hint track information.

30. The method of claim 29, wherein the ISO Base Media File is generated from scalable vector graphics containing both discrete and continuous media, and wherein the ISO Base Media File includes a plurality of SDP boxes for containing either ALC or FLUTE information, in addition to RTP hint track information.

31. A method for progressively providing rich media content to a client device, comprising:
creating an ISO Base Media File, in accordance with an ISO Base Media File container format for storage of rich media content, from input information;
encoding the ISO Base Media File; and
transmitting the encoded ISO Base Media File to the client device,
wherein the ISO Base Media File is generated from scalable vector graphics containing both discrete and continuous media, and wherein the ISO Base Media File includes a plurality of SDP boxes for containing either ALC or FLUTE information, in addition to RTP information.

32. A computer program product, embodied on a non-transitory computer-readable medium, included in a computer-readable media, for progressively providing rich media content to a client device, comprising:
computer-executable program code for creating an ISO Base Media File, in accordance with an ISO Base Media File container format for storage of rich media content, from input information;
computer-executable program code for encoding the ISO Base Media File; and computer-executable program code for transmitting the encoded ISO Base Media File to the client device, wherein the ISO Base Media File is generated from scalable vector graphics containing both discrete and continuous media, and wherein the ISO Base Media File includes a plurality of SDP boxes for containing either ALC or FLUTE information, in addition to RTP information.

33. An electronic device, comprising:

a processor; and a memory unit communicatively connected to the processor and including a computer program product for progressively providing rich media content to a client device, comprising:

computer code for creating an ISO Base Media File, in accordance with an ISO Base Media File container format for storage of rich media content, from input information;

computer code for encoding the ISO Base Media File; and computer code for transmitting the encoded ISO Base Media File to the client device, wherein the ISO Base Media File is generated from scalable vector graphics containing both discrete and continuous media, and wherein the ISO Base Media File includes a plurality of SDP boxes for containing either ALC or FLUTE information, in addition to RTP information.

* * * * *